(12) United States Patent
Matsumoto

(10) Patent No.: US 7,263,348 B2
(45) Date of Patent: Aug. 28, 2007

(54) PORTABLE TELEPHONE TERMINAL DEVICE AND A METHOD FOR RESTRICTING PAY SERVICE FOR USING THE TERMINAL DEVICE

(75) Inventor: Tatsuki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 10/717,064

(22) Filed: Nov. 19, 2003

(65) Prior Publication Data

US 2004/0102179 A1    May 27, 2004

(30) Foreign Application Priority Data

Nov. 20, 2002    (JP)    ............................. 2002-335911

(51) Int. Cl.
*H04M 1/66* (2006.01)
(52) U.S. Cl. ................... 455/410; 455/558; 455/426.1; 455/421; 455/550.1
(58) Field of Classification Search ................ 455/558, 455/405–406, 410–411, 550.1–553, 90.1–90.3, 455/41.1, 421, 426; 235/375, 380; 370/328, 370/338
See application file for complete search history.

(56) References Cited

U.S. PATENT DOCUMENTS

| 5,898,783 | A   |   | 4/1999 | Rohrbach |
| 5,915,226 | A   | * | 6/1999 | Martineau .................... 455/558 |
| 6,044,259 | A   | * | 3/2000 | Hentila et al. ............... 455/406 |
| 6,078,806 | A   | * | 6/2000 | Heinonen et al. ............ 455/406 |
| 6,091,886 | A   |   | 7/2000 | Abecassis |
| 6,216,014 | B1  | * | 4/2001 | Proust et al. ................ 455/558 |
| 6,253,081 | B1  | * | 6/2001 | Koster ......................... 455/433 |
| 6,611,819 | B1  |   | 8/2003 | Oneda |
| 6,783,071 | B2  | * | 8/2004 | Levine et al. .......... 235/462.13 |

(Continued)

FOREIGN PATENT DOCUMENTS

EP    1 161 066    12/2001

(Continued)

OTHER PUBLICATIONS

Chinese Office Action dated Feb. 25, 2005.

(Continued)

*Primary Examiner*—George Eng
*Assistant Examiner*—Kamran Afshar
(74) *Attorney, Agent, or Firm*—Katten Muchin Rosenman LLP

(57) ABSTRACT

To provide a portable telephone terminal device having capability of controlling and inhibiting to use pay service a payer of the telephone does not intend to use, when a user of the telephone differs from a payer. When UIM card is a slave UIM card, the control unit 11 temporarily suspends the input from the operational input unit 13. The control unit 11 reads information of a master UIM card from UIM card module 12 and transmits information of the pay service and a message to desire the entrée of the service from the radio communication unit 14. When the radio communication unit 14 can receive no response within a time limit from the terminal device with master UIM card or the response indicates no permission, the control unit 11 shows the message to have no entrée from the terminal device with master UIM card, on the display unit 15. Then the control unit 11 receives an input from the operational input unit 13, and forcibly terminates the service.

11 Claims, 7 Drawing Sheets

U.S. PATENT DOCUMENTS

| | | | |
|---|---|---|---|
| 6,805,288 B2* | 10/2004 | Routhenstein et al. | 235/380 |
| 6,847,831 B2* | 1/2005 | Huber | 455/558 |
| 6,850,758 B1* | 2/2005 | Paul et al. | 455/422.1 |
| 2001/0043688 A1* | 11/2001 | Sawatzki et al. | 379/114.01 |
| 2002/0055911 A1 | 5/2002 | Guerreri | |
| 2002/0098874 A1* | 7/2002 | Zirul et al. | 455/564 |
| 2002/0102963 A1* | 8/2002 | Heinonen et al. | 455/406 |
| 2003/0027554 A1* | 2/2003 | Haumont | 455/414 |
| 2003/0027575 A1* | 2/2003 | Hasegawa et al. | 455/435 |
| 2003/0028490 A1 | 2/2003 | Miura et al. | |
| 2003/0065805 A1 | 4/2003 | Barnes, Jr. | |
| 2003/0183691 A1* | 10/2003 | Lahteenmaki et al. | 235/441 |
| 2004/0092248 A1* | 5/2004 | Kelkar et al. | 455/411 |
| 2004/0209650 A1* | 10/2004 | Pearce | 455/558 |

FOREIGN PATENT DOCUMENTS

| | | |
|---|---|---|
| EP | 1 187 444 | 3/2002 |
| JP | 11-353397 | 12/1999 |
| JP | 2002-183612 | 6/2002 |
| JP | 2002-183641 | 6/2002 |
| WO | WO 01/05118 | 1/2001 |
| WO | WO 01/35353 | 5/2001 |

OTHER PUBLICATIONS

European Search Report dated Feb. 21, 2006, from corresponding European Application 03090387.6-2414.

Japanese Office Action issued on Apr. 10, 2007, with partial translation, from corresponding Japanese Application No. 2002-335911.

* cited by examiner

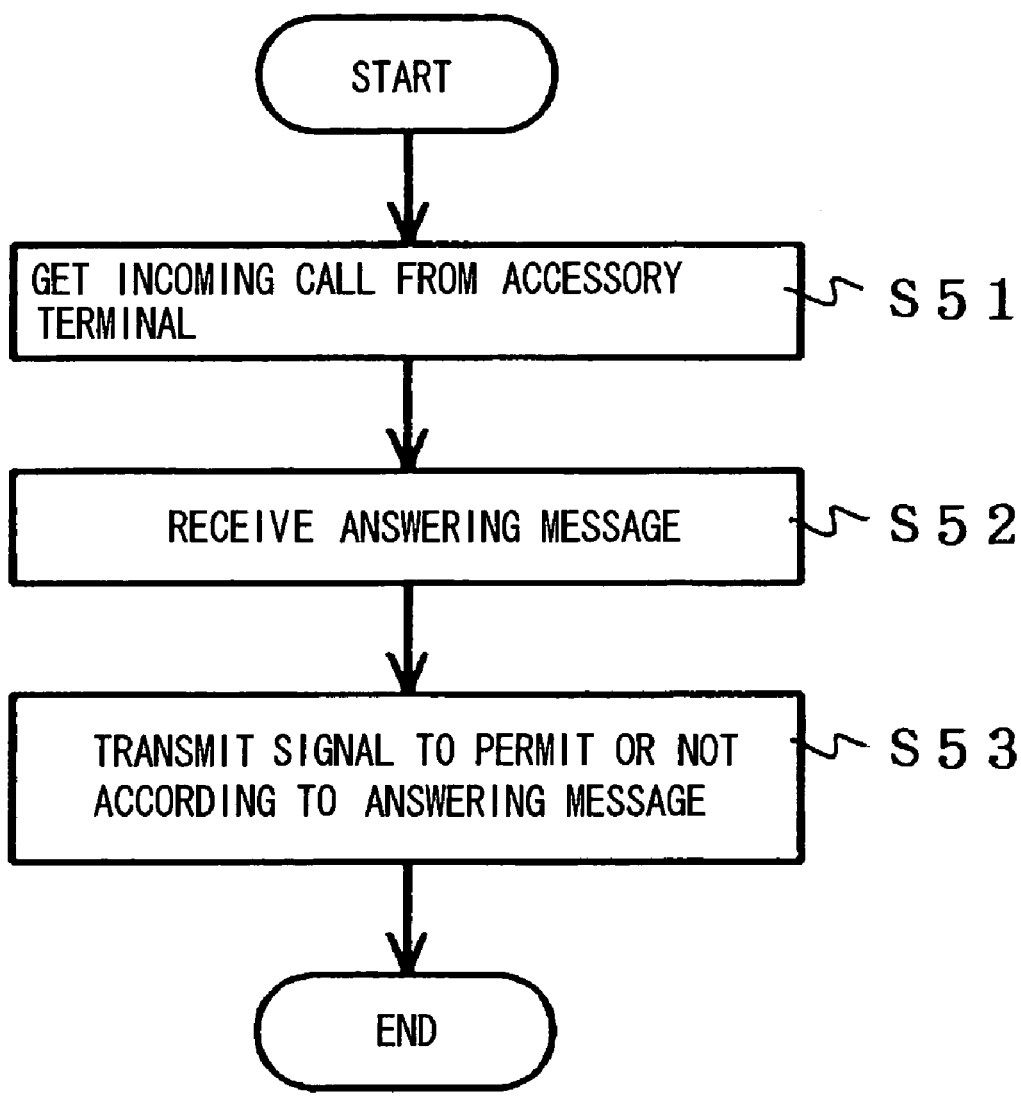

PORTABLE TELEPHONE TERMINAL DEVICE AND A METHOD FOR RESTRICTING PAY SERVICE FOR USING THE TERMINAL DEVICE

FIELD OF THE INVENTION

The present invention relates to a portable telephone terminal device and a method for restricting pay service for using the terminal device, and in particular to a method for charging for pay service for using the portable telephone terminal device.

BACKGROUND OF THE INVENTION

Recently the portable telephone terminal devices have not only the telephonic function for outgoing or incoming call but also the WEB browsing function to connect the Internet and the mailing function to receive or send the electronic mail.

In this case, the portable telephone terminal devices are charged for using such functions by the telephone Service Company. Furthermore the portable telephone terminal devices have the credit card function for no cash payment to use the charging function by the telephone service company (see ref. 1 or 2 for example).

The owner of the portable telephone terminal device can get service to contract and pay the various pay service or articles when he uses the WEB browsing function or the credit card function.

Japanese Patent Publication JP-P2002-183612A (hereinafter referred to as ref. 1) discusses providing a method for non-cash account settlement allowing account settlement in all commercial transactions, using a portable terminal or carrying only norrable terminal without using cash or various cards. The method for non-cash account settlement in paying the charge for goods and service (excluding information providing service using a telephone), comprises the procedure (step 1) of telephoning the portable terminal owned by a user, presenting at least the cause of a claim and the amount of money and making an inquiry as to whether to permit account settlement, the procedure (step 2) of confirming the input of permission of account settlement from the portable terminal, the procedure (step 3) of charging the use charge to a concerned payment account in relation to the use details such as the specifications of goods and service, the date and time of use and a charge for use, and the procedure (step 4) of informing a goods-service providing site to the effect that charging processing to the payment account of the portable terminal is completed. (Abstract, page 9, page 10, and FIG. 19).

Japanese Patent Publication JP-P2002-183641A (hereinafter referred to as ref. 2) discusses providing a principal confirming method and a principal confirming system required in cashless settlement of a service charge, such as the use of a parking garage, shopping and a mail-order sale in a store, and use of Internet ASP. The principal authenticating method required in the cashless settlement, comprises a procedure (a step 1) for informing a control device arranged in a providing site of commodity and service of a telephone number of a portable information terminal possessed by a user, a procedure (a step 2) for informing a settlement control device of the telephone number of the information terminal from a control device, a procedure (a step 3) for inquiring whether to approve to perform settlement by presenting a demand cause and the amount by telephoning to the information terminal of the telephone number from the settlement control device, and a procedure (a step 4) for confirming the principal, by confirming the input of the effect of approving the perform the settlement. (Abstract, page 7, page 8, and FIG. 19)

SUMMARY OF THE DISCLOSURE

However, in such prior art portable telephone terminal devices, a problem arises that it is necessary for a payer of a toll to pay an unforeseen additional payment, because a user of a telephone can freely contract with a pay service without reference to the intention of the payer who pays the toll of a portable telephone terminal device when a user of the telephone differs from a payer of the toll of the telephone, for example, when a parent pays the toll in the case his child uses the phone.

It is therefore an object of the present invention to solve the above-mentioned problem and to provide a portable telephone terminal device having a capability of controlling and inhibiting to use pay service which the payer of the telephone does not intend to use, and a method for restricting pay service for using the phone, when a user of the telephone differs from a payer.

According to a first aspect of the present invention, there is provided a portable telephone terminal device comprising; a recording medium to record information of a subscriber, and means for restricting execution of a service that incurs payment, except for a telephone call service, based on information indicative of a master-slave relation recorded in said recording medium.

According to a second aspect of the present invention, there is provided a method for restricting pay service for a portable telephone terminal device comprising: recording in a recording medium information, of a subscriber, indicative of master-slave relation, deciding whether the information recorded in the recording medium indicates master or slave, and restricting execution of a service that incurs payment, except for telephone call service based on the decision.

That is to say, the portable telephone terminal device of the present invention may be a terminal device comprising UIM (User Identity Module) [SIM (Subscriber Identity Module), USIM (Universal Subscriber Identity Module), termed "UIM card" comprehensively, hereinafter] card to record information of a subscriber. The UIM card has information indicative of master or slave. When a payment for toll except general telephone message becomes necessary by a registration for pay site or use of a credit function in a terminal with a slave UIM card, the registration or payment is restricted in the terminal by itself to provide a notification to generate a registration or a payment for the terminal with the master UIM card, and there is provided a structure in which registration and use for pay site are impossible without acknowledgement from a terminal with a master UIM card.

Specifically in the portable telephone terminal device of the present invention, a UIM card kept by a UIM card module stores personal information to indicate whether the status is master or slave as personal information, and information of the telephone number of UIM card indicative of the master-slave relation.

In the case of occurrence of a payment except telephone call, a portable telephone terminal device recognizes the occurrence of the payment by a control unit and reads the information stored in the UIM card from UIM card module. When personal information in the UIM card indicates that the status is slave, the control unit restricts input from an operational input unit and notifies the occurrence of the payment to a portable telephone terminal device with the UIM card indicating that the status is master.

When a portable telephone terminal device with a UIM card indicating that the status is master receives the notification, it transmits a reply for permission or restriction. When the control unit receives a reply for permission from the portable telephone terminal device with the UIM card indicating that the status is master, the control unit cancels the restriction of the input from operational input unit to make the registration for pay service possible.

Therefore according to the portable telephone terminal device of the present invention, in terms of the slave terminal device it is impossible to execute the registration and the payment for pay service which is not recognized by an owner of the master terminal device with the UIM card.

As mentioned above, the portable telephone terminal device has a capability of controlling and inhibiting to use pay service a payer of the telephone does not intend to use, when a user of the telephone differs from the payer. Accordingly, a user of the terminal cannot freely contract with a pay service without intention of a payer who pays the toll of portable telephone terminal device, which will eliminate the problem to generate an unforeseen additional charge for the payer.

BRIEF DESCRIPTION OF THE DRAWINGS

FIG. 7 is a flowchart showing an operation of a portable telephone terminal device in the second embodiment of the present invention.

PREFERRED EMBODIMENTS OF THE INVENTION

Figure 1:
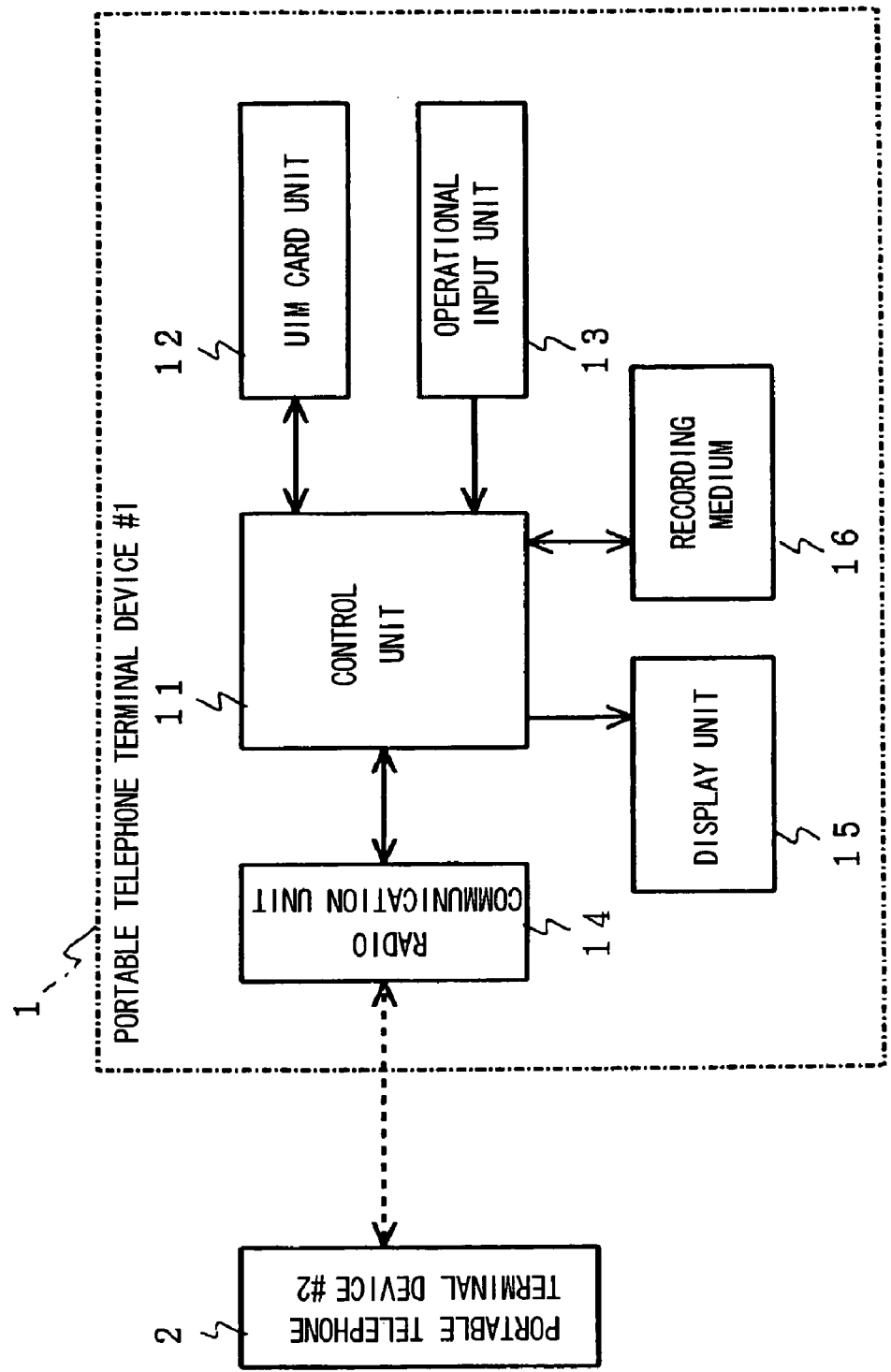
FIG. 1 is a block diagram showing a structure of a portable telephone terminal device in a first embodiment of the present invention.

Now, modes of embodying the present invention will be described with reference to the drawings. FIG. 1 is a block diagram showing a structure of a portable telephone terminal device in a first embodiment of the present invention. In FIG. 1, a portable telephone terminal device (#1) 1 is made up of control unit 11, UIM (User Identity Module) card module 12, operational input unit 13, radio communication unit 14, display unit 15, and recording medium 16. A portable telephone terminal device (#2) 2 is made up of the same as the device (#1) 1.

Control unit 11 executes recognition of inspection and registration for pay service, acquisition of the identity information, restriction of the inspection and registration etc., transmission of a request to cancel the restriction, and output of a message denoting unauthorized when receiving a notification denoting unauthorized. UIM card module 12 is a reading module for UIM card (not shown) storing information of a subscriber. UIM card stores personal information to indicate whether the status is master or slave as personal information, and information of the telephone number of the UIM card indicative of the master-slave relation.

The operational input unit 13 receives input from the user side of a portable telephone terminal device (#1) 1. The radio communication unit 14 has a function of local radio communication such as Bluetooth (registered trademark), and executes transmitting and receiving for the data among the telephones under the master-slave relation.

The display unit 15 executes output to a display equipment for user side. The recording medium 16 stores a program (executable program by a computer) to control each unit module.

Figure 2:
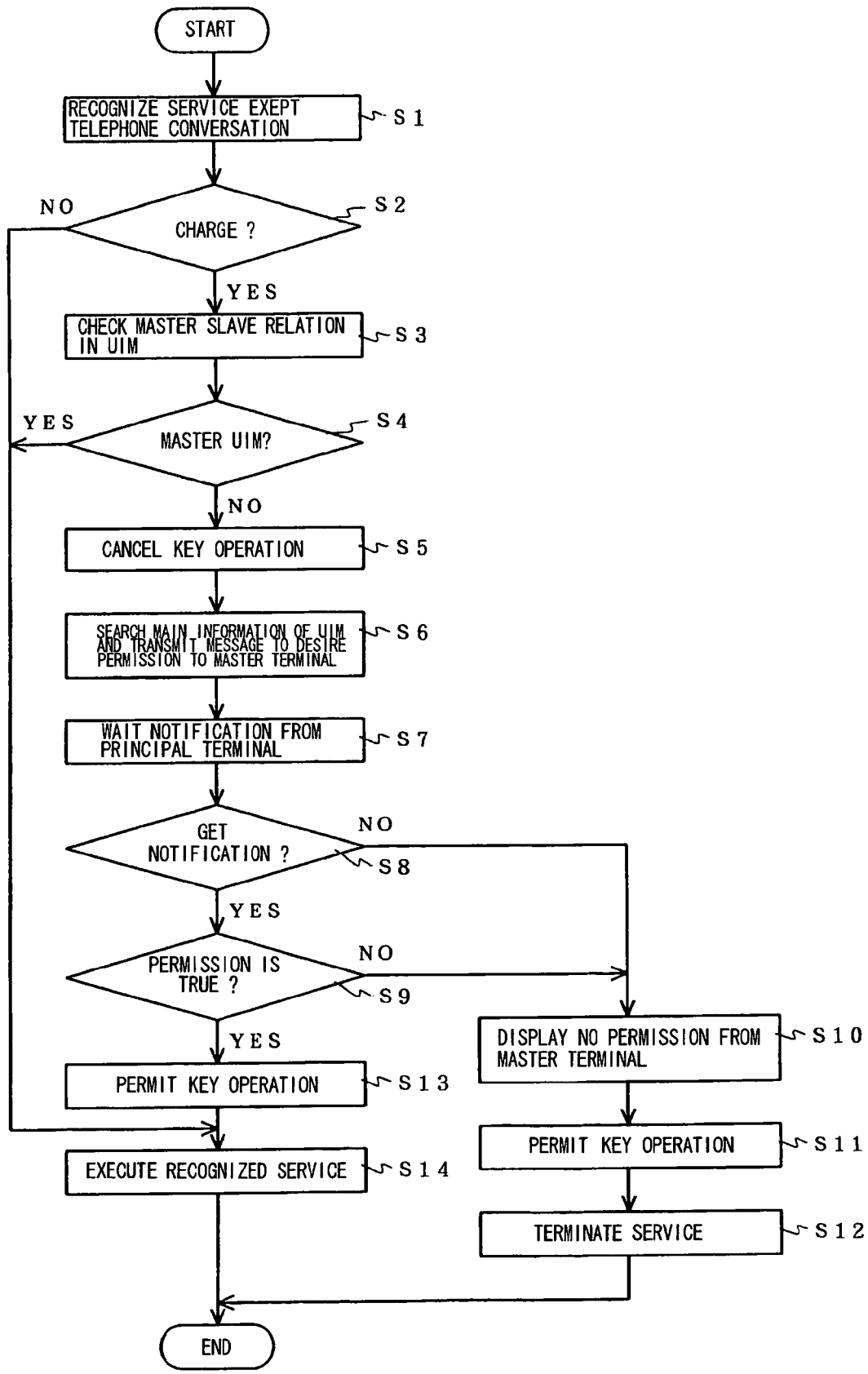
FIG. 2 is a flowchart showing an operation of a portable telephone terminal device in the first embodiment of the present invention.
Figure 3:
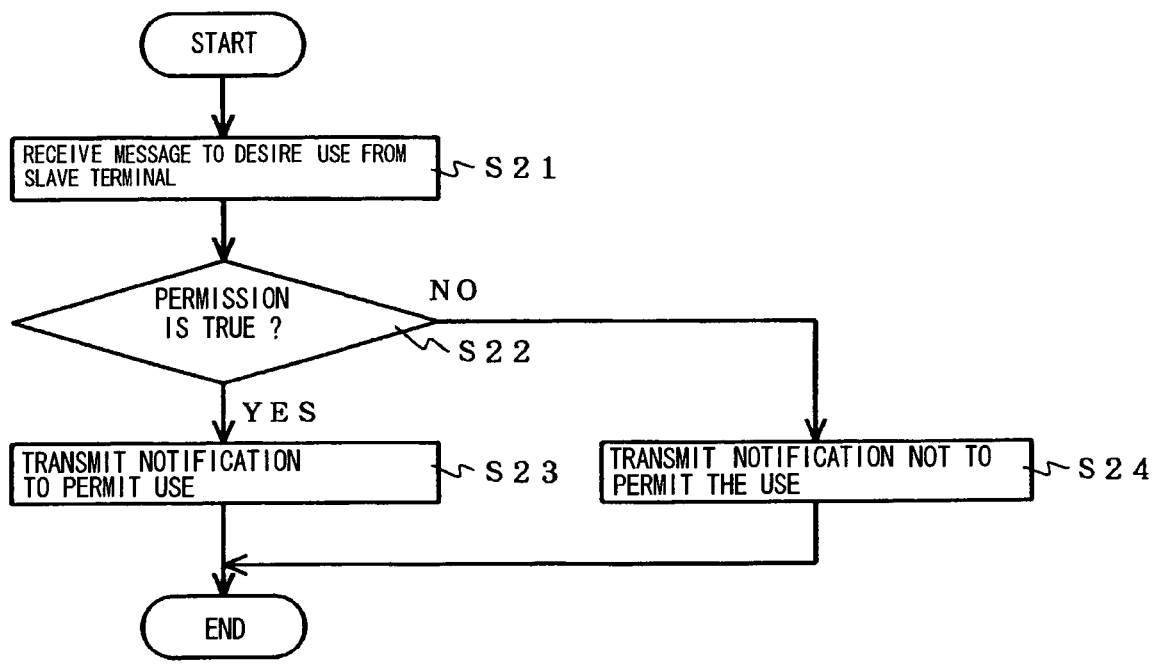
FIG. 3 is a flowchart showing an operation of a portable telephone terminal device in the first embodiment of the present invention.

FIG. 2 and FIG. 3 are flowcharts showing an operation of a portable telephone terminal device in the first embodiment of the present invention. An operation of portable telephone terminal devices (#1 and #2) 1 and 2 in the first embodiment of the present invention will be described with reference to FIGS. 1 through 3. Hereafter a UIM card indicating that the status is master is called "master UIM card", and a UIM card indicating that the status is slave is called "slave UIM card". The processes shown in FIG. 2 and FIG. 3 are realized when the control unit 11 of portable telephone terminal devices (#1 and #2) execute the program with the recording medium 16.

When a user uses a service except telephone conversation [for example browsing function of the portable telephone terminal devices (#1) 1] on the portable telephone terminal devices (#1), the control unit 11 recognizes the use of a service (step S1 in FIG. 2), and verifies whether a charge of the service other than the telephone call or communication (the charge of normal packets) is demanded or not (step S2 in FIG. 2).

The control unit 11 executes the process of the service when the service does not have a charge (step S14 in FIG. 2). On the other hand, when the service demands the charge, the control unit 11 reads the personal information from the UIM card kept by UIM card module 12 and checks UIM whether the status is master or slave (step S2 in FIG. 2).

When the UIM card is a master UIM card (step S4 in FIG. 2), the control unit 11 executes directly the process of the service irrespective of including change, i.e., without reference to the charge (step S14 in FIG. 2). On the other hand, when UIM card is a slave UIM card (step S4 in FIG. 2), the control unit 11 temporarily suspends the input from the operational input unit 13 (canceling key operation) (step S5 in FIG. 2).

The control unit 11 reads information of a master UIM card from UIM card module 12 and transmits information of the pay service and a message to desire the entrée of the service from the radio communication unit 14 (step S6 in FIG. 2). Subsequently the control unit 11 waits a response (step S7 in FIG. 2).

When the radio communication unit 14 does not receive a response within a time limit from the terminal device with master UIM card (step 38 in FIG. 2), the control unit 11 shows the message to have no entrée from the terminal device with master UIM card, on the display unit 15 (step S10 in FIG. 2). Then the control unit 11 receives an input from the operational input unit 13 (permitting key operation) (step S11 in FIG. 2), and forcibly terminates the service (step S12 in FIG. 2).

On the contrary, when the radio communication unit 14 can receive the response from the terminal device with master UIM card (step S8 in 10. FIG. 2), the control unit 11 checks whether the use of the service is permitted or not (step S9 in FIG. 2). When the permission is decided, the control unit 11 receives an input from the operational input unit 13 (permitting key operation) (step S13 in FIG. 2), and executes the service (step S14 in FIG. 2).

When no permission is provided (in other words, when a restriction is decided), the control unit 11 shows a message of no permission from the terminal device with master UIM card, an the display unit 15 (step S10 in FIG. 2). Then the control unit 11 receives an input from the operational input unit 13 (permitting key operation) (step S11 in FIG. 2), and forcibly terminates the service (step S12 in FIG. 2).

On the other hand, when the portable telephone terminal devices (#2) 2 with master UIM card receives a message to desire the permission of the pay service from the portable telephone terminal device (#1) 1 with slave UIM card (step S21 in FIG. 3), the portable telephone terminal device (#2) 2 decides whether or not the decision of the user is to be permitted to use (step S22 in FIG. 3).

When the decision of the user is to permit use, the portable telephone terminal device (#2) 2 wtth master UIM card transmits a message of the permission to use to the portable telephone terminal device (#1) 1 with slave UIM card (step S23 in FIG. 3). When the decision of the user is not to permit use, the portable telephone terminal device (#2) 2 with master UIM card transmits a message of restriction (in other words, the incapability to use) to the portable telephone terminal device (#1) 1 with slave UIM card (step S24 in FIG. 3).

In the present embodiment as mentioned above, the master-slave relation is created for the portable telephone terminal devices (#1 and #2) 1 and 2 by the use of the recording medium for example UIM card. Herewith when the charge of the service other than telephone call is demanded in the slave portable telephone terminal device (#1) 1, the permission of an owner having the master portable telephone terminal device (#2) 2 is needed and the payer of the account can be freed from an unexpected account of the charge.

Accordingly, in the present embodiment the portable telephone terminal device has a capability of controlling and inhibiting to use pay service the payer of the telephone does not intend to use, when the user of the portable telephone terminal device (#1) differs from the payer. Consequently the user of the portable telephone terminal device (#1) cannot freely make a contract with a pay site etc. without reference to the intention of the payer of the charge for the telephone, and the problem that the payer is charged for the unexpected extra account becomes insignificant.

Furthermore the above-mentioned UIM [SIM (Subscriber Identity Module), USIM (Universal Subscriber Identity Module)] card can be used as a recording medium having stored information of other subscribers, or there is no limitation like this.

In the present embodiment, the operational input unit 13 is disabled when no permission is decided. However, instead of disabling the operational input unit 13, the unit can be controlled so as to be unable to press only OK on a display shot for authenticating a pay service (to be able to operate canceling etc.), and the present invention is not limited to the disclosed embodiment.

Furthermore in the present embodiment, the radio communication unit 14 executes transmitting and receiving of the data among the telephones having a function of local radio communication such as Bluetooth (registered trademark). However a radio communication unit may be employed that can execute transmitting and receiving through a network via general base station in which transmission is carried out using a mail or data transmission alternative of the mail that contains information of the master-slave relation, and the present invention is not limited to the embodiment.

Figure 4:
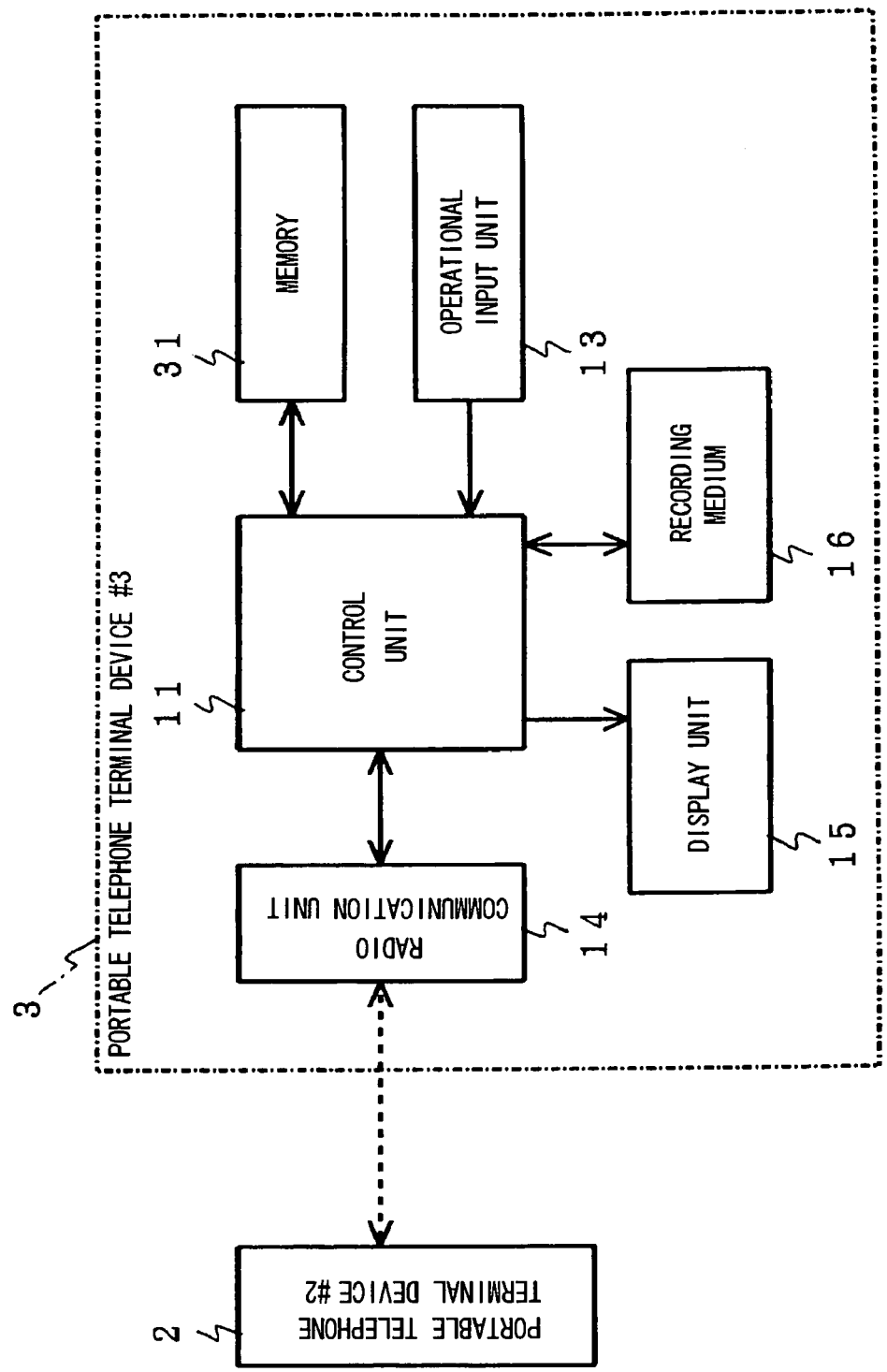
FIG. 4 is a block diagram showing a structure of a portable telephone terminal device in a second embodiment of the present invention.

FIG. 4 is a block diagram showing a structure of a portable telephone terminal device in a second embodiment of the present invention. FIG. 4 shows an embodiment having a structure similar to the first embodiment of the present invention shown in FIG. 1, except that a portable telephone terminal device (#3) 3 in the second embodiment of the present invention has a memory 31 which stores the personal information of the master-slave relation instead of UIM card module 12. Same components of the structure have same reference symbols, respectively. The operation of the same component of the structure is similar to one of a first embodiment of the present invention.

Figure 5:
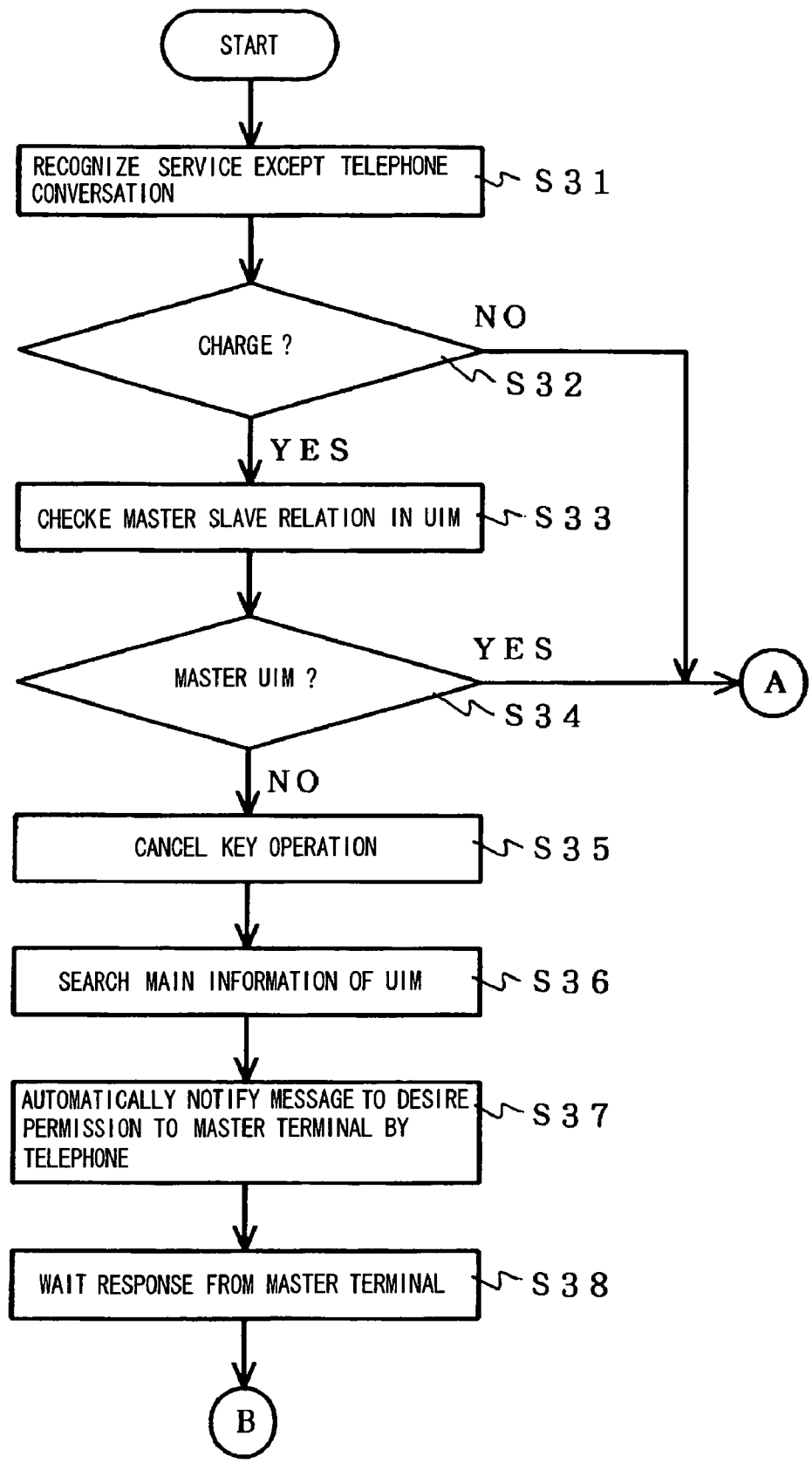
FIG. 5 is a flowchart showing an operation of a portable telephone terminal device in the second embodiment of the present invention.
Figure 6:
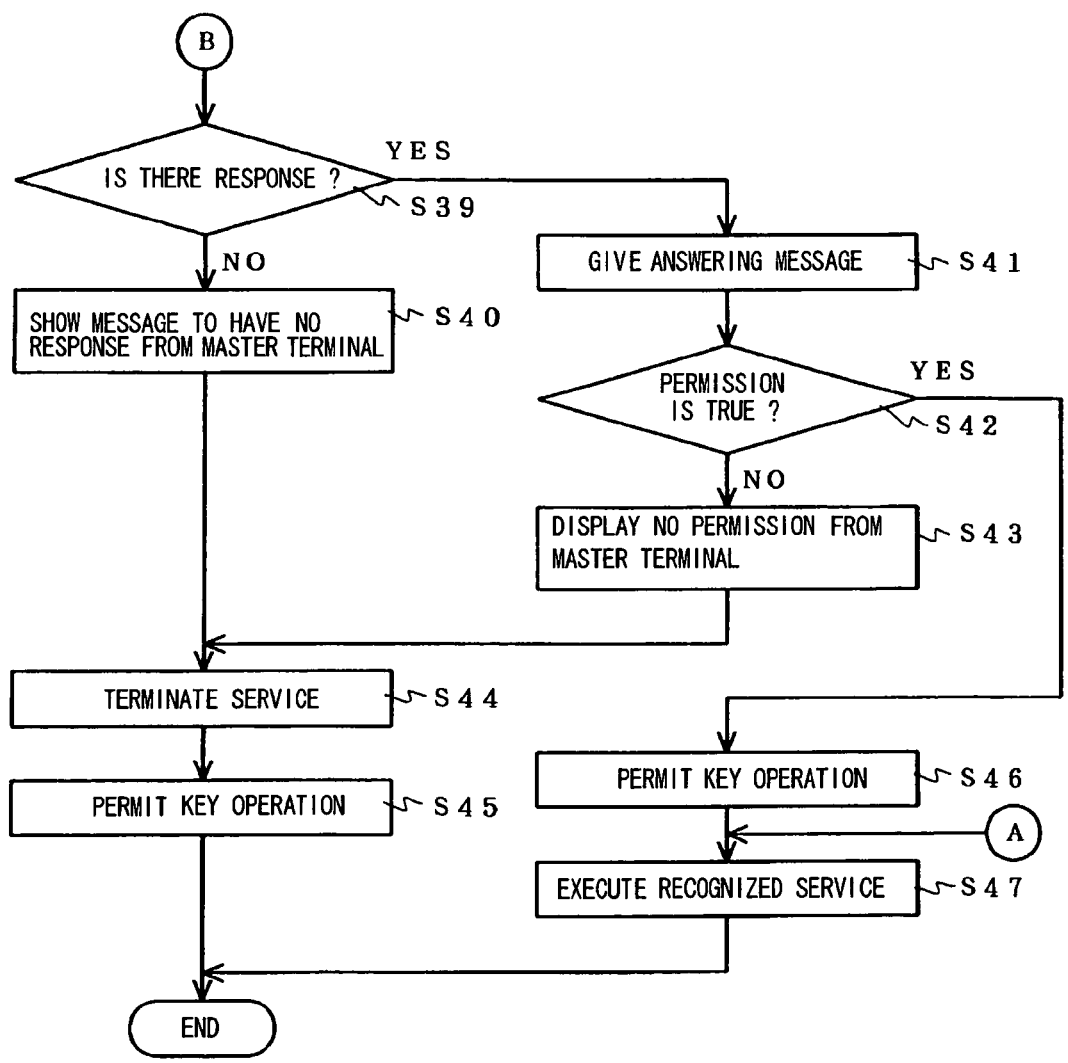
FIG. 6 is a flowchart showing an operation of a portable telephone terminal device in the second embodiment of the present invention.

FIGS. 5 through 7 are flowcharts showing operations of a portable telephone terminal device in the second embodiment of the present invention. Since the portable telephone terminal device in the second embodiment of the present invention has the structure similar to the portable telephone terminal device in the first embodiment of the present invention, the operations of portable telephone terminal devices (#1 and #2) 1 and 2 in the second embodiment of the present invention will be described with reference to FIG. 1 and FIGS. 5 through 7.

The processes shown in FIGS. 5 through 7 are realized when the control unit 11 of portable telephone terminal devices (#1 and #2) 1 and 2 executes a program with the recording medium 16. The radio communication unit 14 is not a radio communication unit that executes transmitting and receiving of the data among the telephones having the function of local radio communication such as Bluetooth (registered trademark). However, the radio communication unit 14 is a radio communication unit that executes telecommunication via a base station used for the general portable telephone terminal devices.

The present embodiment differs from getting the permission of service according to transmitting and receiving of the data by local radio communication or a mail via network. The difference from the operation of above-mentioned first embodiment of the present invention resides in that the portable telephone terminal device (#1) 1 with slave UIM card gets a permission from the portable telephone terminal device (#2) 2 with slave UIM card over the telephone line as follows: when the portable telephone terminal device (#1) 1 with slave UIM card calls the portable telephone terminal device (#2) 2 with slave UIM card and the terminal device (#2) 2 initiates a talk, a voice guidance is given that the terminal device (#1) 1 desires the permission.

In FIG. 5, steps S31 through S35 have an operation similar to steps S1 through S5 in FIG. 2. When the control unit 11 recognizes the slave UIM card in step S34, the control unit 11 suspends an input from the operational input unit 13 (canceling key operation) (step S35 in FIG. 5). Thereafter the control unit 11 reads the information of the terminal device (#2) 2 with master UIM card from UIM card module 12 (step S36 in FIG. 5) and calls the portable telephone terminal device (#2) 2 with master UIM card (steps S37 and S38 in FIG. 5).

When the portable telephone terminal device (#2) 2 with master UIM card does not respond (step S39 in FIG. 5), the control unit 11 shows a message to have no response from the terminal device (#2) 2 with master UIM card on the display unit 15 (step S40 in FIG. 6). Thereafter the control unit 11 forcibly terminates the service (step S44 in FIG. 6) and restores receiving input from the operational input unit 13 (permitting key operation) (step S45 in FIG. 6).

On the other hand, when there is a response from the terminal device (#2) 2 with master UIM card (step S39 in FIG. 6), the control unit 11 gives an answering message to desire the permission of the pay service to the terminal device (#2) 2 with master UIM card (step S41 in FIG. 6) and gets a signal to permit or not by key operation of the terminal device (#2) 2 with master UIM card (step S42 in FIG. 6).

When the response from the terminal device (#2) 2 with master UIM card shows the permission (step S42 in FIG. 6), the control unit 11 restores the reception of the input from the operational input unit 13 (permitting key operation) (step S46 in FIG. 6) and executes the confirmed service (step S47 in FIG. 6).

On the other hand, when the response from the terminal device (#2) 2 with master UIM card shows no permission (step S42 in FIG. 6), the control unit 11 shows a message to have no permission from the terminal device (#2) 2 with master UIM card on the display unit 15 (step S43 in FIG. 6). Thereafter the control unit 11 forcibly terminates the service (step S44 in FIG. 6) and restores the reception of the input from the operational input unit 13 (permitting key operation) (step S45 in FIG. 6).

When the portable telephone terminal devices (#2) 2 with master UIM card gets an incoming call from the portable telephone terminal device (#1) 1 with slave UIM card (step S51 in FIG. 7) and receives an answering message to desire the permission of the pay service (step S52 in FIG. 7), the portable telephone terminal device (#2) 2 transmits a signal to permit or not by the key operation according to the answering message (step S53 in FIG. 7).

The meritorious effects of the present invention are summarized as follows.

In the portable telephone terminal device with a recording medium to record the information of a subscriber, the portable telephone terminal device has a capability of controlling and inhibiting to use pay service that a payer of the telephone does not intend to use, when a user of the telephone differs from the payer, according to restricting execution of the service that charges payment except telephone call by the information indicative of the master-slave relation recorded in the recording medium.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A portable telephone terminal device, comprising:
   a recording medium adapted to record information of a subscriber, and
   means for restricting execution of a service that incurs payment, except for a telephone call service, based on information indicative of a master-slave relation recorded in said recording medium;
   wherein said restriction means executes restriction according to one of a permission and a restriction from a second terminal device having a second recording medium that records information indicative of the master-slave relation when the information recorded in the second recording medium of the second terminal device indicates the second terminal device is a master, and when the information recorded in the recording medium of the portable telephone terminal device indicates the portable telephone terminal device is a slave.

2. A portable telephone terminal device as defined in claim 1, wherein:
   said restriction means forcibly terminates said service when no response is received or the restriction is received from the second terminal device that records the information indicative of the master.

3. A portable telephone terminal device as defined in claim 1, wherein:
   said recording medium is one of a User Identity Module (UIM) card, a Subscriber Identity Module (SIM) card, and a Universal Subscriber Identity Module (USIM) card.

4. A portable telephone terminal device as defined in claim 1, wherein:
   the portable telephone terminal device and the second terminal device do not communicate directly.

5. A method for restricting pay service for a portable telephone terminal device, comprising:
   recording in a recording medium information, of a subscriber, indicative of a master-slave relation,
   deciding whether the information recorded in the recording medium indicates a master or a slave, and
   restricting execution of a service that incurs payment except for a telephone call service, based on the decision;
   wherein said restricting stop is performed according to one of a permission and a restriction from a second terminal device which has a second recording medium that records information indicative of the master-slave relation when the infomation recorded in the second recording medium of the second terminal device indicates the second terminal device is a master, and when the information recorded in said recording medium of the portable telephone terminal device indicates die portable telephone terminal device is a slave.

6. A method for restricting pay service as defined in claim 5, wherein:
   said restriction step forcibly terminates said service when no response is received or the restriction is received from the second terminal device that records the information indicative of the master.

7. A method for restricting pay service as defined in claim 5, wherein:
   said recording medium is one of a User Identity Module (UIM) card, a Subscriber Identity Module (SIM) card, and a Universal Subscriber Identity Module (USIM) card.

8. A method for restricting pay service as defined in claim 5, wherein:
   the portable telephone terminal device and the second terminal device do not communicate directly.

9. A system of managing mobile communication devices, comprising:
   an arrangement for receiving from a mobile device a request for a special fee service;
   an arrangement for querying the mobile device for an indication of a master-slave status;
   an arrangement for providing the special fee service if the mobile device is a master device; and an arrangement for receiving an authorization from a second mobile device associated with the mobile device;

wherein if the mobile device is a slave device, the special fee service is not provided unless the authorization is received from the second mobile device; and wherein the authorization is from the second mobile device having a second recording medium which has information indicative of the master-slave status and the information indicates that the second mobile device is the master device.

10. A system of managing mobile communication devices as defined in claim 9, wherein: the master-slave relation is between the mobile device and the second mobile device.

11. A system of managing mobile communication devices as defined in claim 9, wherein:

the mobile device and the second mobile device do not communicate directly.

\* \* \* \* \*